United States Patent

[11] 3,614,143

[72] Inventor Milton J. Stevens
 1812 Crestmont Court, Glendale, Calif. 91208
[21] Appl. No. 54,217
[22] Filed July 13, 1970
[45] Patented Oct. 19, 1971

[54] FERRULE UNIT FOR FISHING RODS AND METHOD OF CONSTRUCTION
 5 Claims, 3 Drawing Figs.
[52] U.S. Cl. .................................................. 287/126, 43/18
[51] Int. Cl. ....................................................... F16d 7/00
[50] Field of Search .......................................... 287/126, 108; 43/18 R, 23; 279/102

[56] References Cited
UNITED STATES PATENTS
| | | | |
|---|---|---|---|
| 537,088 | 4/1899 | Varney .......................... | 287/126 |
| 2,600,629 | 6/1952 | Feierabend .................... | 287/126 |

FOREIGN PATENTS
| 686,349 | 1/1953 | Great Britain ................ | 287/126 |

Primary Examiner—Reinaldo P. Machado
Assistant Examiner—Andrew V. Kundrat
Attorney—Hyman Jackman ABSTRACT: A ferrule unit for connecting sections of a fishing rod formed of male and female ferrules that have a telescopic interfit which is on an extremely small taper and is cushioned by an O-ring provided on the end of the male ferrule and engaged with the tapered surface of the female ferrule, and a method for producing such a ferrule unit.

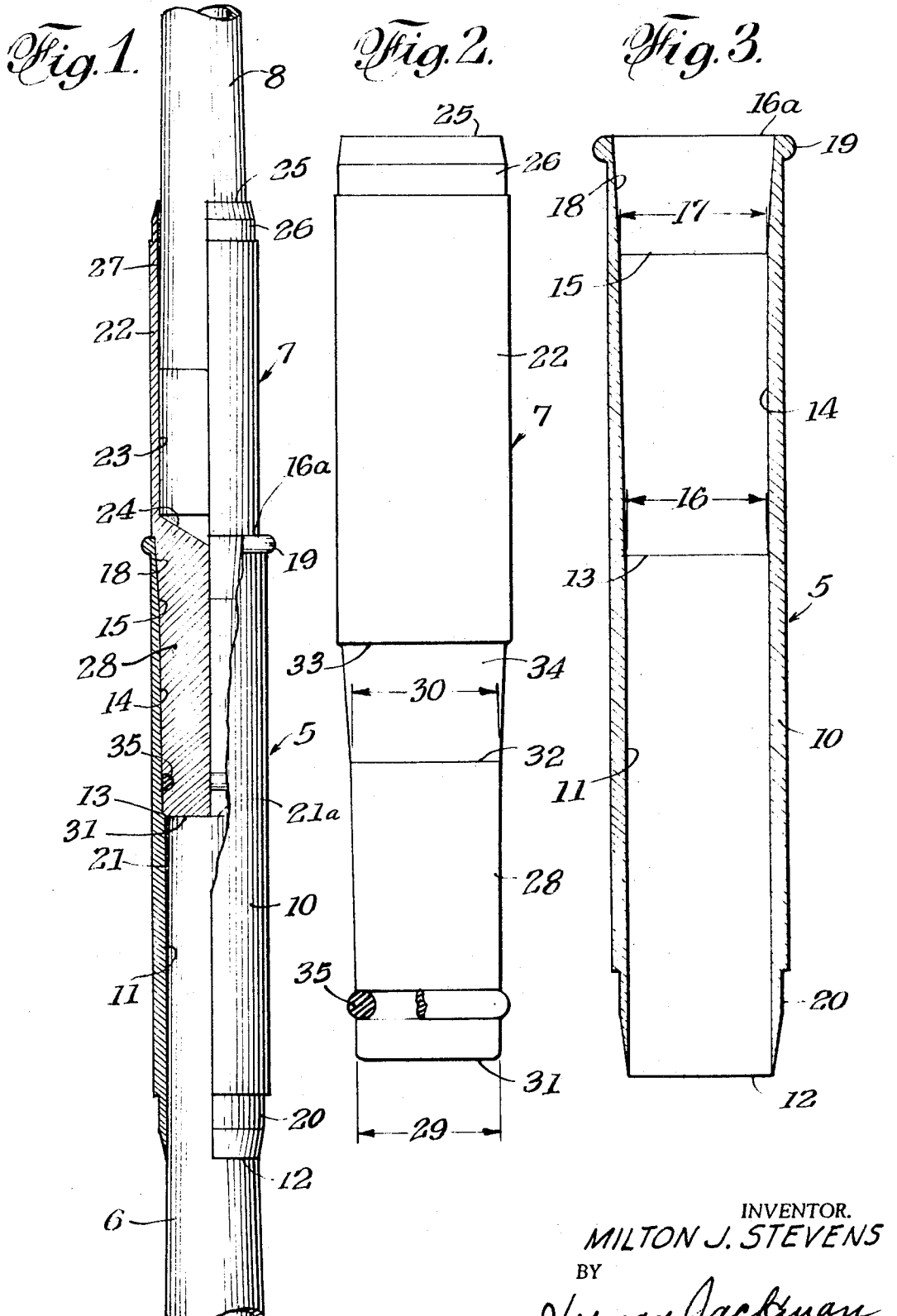

FERRULE UNIT FOR FISHING RODS AND METHOD OF CONSTRUCTION

BACKGROUND OF THE INVENTION

1. Field of the Invention

For connecting adjoining sections of fishing rods and other such sections, generally.

2. Description of the Prior Art

Rod-connecting ferrules are known but neither the tapered interfit of the instant structure nor the method of producing the same are suggested in art known to applicant.

SUMMARY OF THE INVENTION

The present ferrule unit comprises, generally, a female ferrule 5 adapted for permanent connection to a fishing rod section 6, and a male ferrule with an adjoining fishing rod section 8. Said ferrule are advantageously formed of heat-treated aluminum alloy and provided with an anodized finish coating.

An object of the invention is to provide a ferrule unit of the character referred to that provides for maximum matching of ferrules.

Another object of the invention is to provide a ferrule unit that is characterized by smooth, play-free fit and free of "-ticking" noises frequently occurring when the fishing rod is bent under casting stresses and accompanying the "playing" of a fish.

A further object of the invention is to provide a ferrule unit as above that is light in weight, flexible with backbone, breakage resistant with substantially total interchangeability. Also, the unit is "seizure" free.

A yet further object of the invention is to provide an improved and simple method for constructing the above characterized ferrule unit and which is effective for providing such unit with the improved characteristics enumerated in the foregoing objects.

This invention also has for its objects to provide a novel, economical and convenient method or process of superior utility, and to provide an article that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows and the following description merely describes the invention with respect to a preferred method and apparatus, the same, nevertheless, being given by way of illustration or example only.

In the drawing, like reference characters designate similar parts in several views.

BRIEF DESCRIPTION OF THE DRAWING

FIG. 1 is an enlarged view, partly in elevation and partly in section, of a ferrule unit embodying the present invention and shown connected to adjacent ends of two sections of a fishing rod or of similar-elongated members.

FIG. 2 is a further enlarged elevational view of the male ferrule of said unit.

FIG. 3 is a similarly enlarged longitudinal sectional view of the female ferrule of the unit. DESCRIPTION OF THE PREFERRED EMBODIMENT The rod sections 6 and 8 may not be, but are preferably tapered, so thread may to be wound thereover for neat appearance and added strength.

The female ferrule section 5 is machined throughout and is in the form of a cylindrically tubular sleeve 10 having an interior bore 11 that is cylindrical or tapered from the end 12 of said sleeve to a point 13 at the approximate middle of the length of said sleeve. From said point 13, the bore 11 is formed to have a widening taper 14 to the point 15 near the other end 16a of said sleeve. In the present case, said widening taper or flare 14 is in the nature of 0.002 inch in ferrules in which the bore 11 is approximately between 11/64 and 48/64 in steps of 1/64 inch, inclusive. Thus, if the dimension 16 of the cylindrical bore at the point 13 is 11/64, the dimension 17 at the point 15 is 11/64.+0.002 inch. Between the point 15 and the end 16a of the ferrule 5, the bore 11 is increasingly enlarged to have a widening taper 18 of approximately 7°. This 7° then matches the 7° angle on the mating male part and insures against looseness or wobble.

According to the present method, the bore 11 is formed by a single boring tool that is especially dimensioned to have an outer end portion that is entered into and piloted in the cylindrical portion of the bore 11, an intermediate portion that forms the taper 14 in said bore 11, and an inner end portion that forms the 7° taper 18. Of course, the size of the boring tool that is used has its pilot end conform in diametral size to that of the size of the cylindrical portion of the bore 11.

Said female ferrule 5, at its end 16a is provided with an annular bead 19 that has the dual function of affording a handgrip facilitating separation of ferrule 5 from the rod section 6 and also serves to thicken said end 16a so the same will not stretch to cause the tapered socket 18 to bell-mouth when when the rod is being whipped and subjected to great flexure when so used. A permanent anodized coating is provided on all surfaces of the ferrule 5 thus produced.

At its end 12, the ferrule 5 is reduced in outer diametral size to provide a reduced portion 20 for turns or wrappings of silk or similar thread that are continued or adjacent portions of rod 6 and the sleeve 10, for the purposes of finishing off the assembly of rod and ferrule.

The above ferrule 5 is telescopically connected with the rod section 6. The tip of said rod being usually reverse tapered, is joined to said ferrule by a suitable cement or other binder 21 that fills the annular space formed between the cylindrical inner bore 11 and the tapered end 21a of the rod section 6. The end 21a of the latter terminates short of the point 13 of the ferrule 5, in any case, not beyond said point.

The male ferrule section 7 comprises a tubular portion 22 of which the bore 23 is cylindrical and terminates in a blind end 24, that is approximately midway of the ends of said ferrule 7. At its end 25, said portion 22 is reduced at 26 similarly to the reduced portion 20 and for the same purpose—that of permanently connecting the ferrule 7 to the rod section 8, while the enlarged end of the latter extends into the bore 23 and is cemented at 27 to the sleeve 22.

A cylindrical plug 28 extends from the end of ferrule 7 oppositely from its end 25, the same being diametrally smaller than the tubular portion 22. While said plug is termed as being cylindrical, in actual practice, its end dimension 29 is 0.0002 inch smaller than the dimension 30. It will be noted that said plug 28 exactly fits the tapered bore portion 14 of the female ferrule, since the longitudinal spacing between the end 31, at dimension 29, and the point 32, at dimension 30, coincides with the longitudinal spacing between the points 13 at dimension 16, and point 15, at dimension 17, of the bore part 14 of the sleeve 10.

Between the point 32 of the plug 28 and a fileted shoulder 33, said plug is provided with a widening tapered portion 34 which is 7° so as to conform to and exactly fit the 7° taper 18 of the sleeve 10 thereby ensuring against looseness or wobble between the ferrules. It will be clear from the foregoing that when the plug 28 is entered into the sleeve and the shoulder 33 of the ferrule 7 is abutted with the end 16a of the ferrule 5, there will be such fit of said plug in the bore part forming the tapers 14 and 18, that under use, there will be a tight, "nonticking" fit, as herein contemplated.

Although there is metal-to-metal contact between the plug 28 and the sleeve 10, when the ferrules are joined, the fit is cushioned by an O-ring 35 that is under compression by the bore part 14 to provide shock absorption. Said O-ring, in addition to cushioning the fit, serves to clean the surfaces of the bore 11, and lubricate the interconnection.

The outer peripheral surfaces of the ferrule 7 are formed in a single centerless grinding operation by a grinding wheel preformed to match those bore dimensions of the bore 11 of the ferrule 5 with which it mates.

Centerless grinding, as above, allows for caustic etching and stock removal of the surface of the plug 28 between its end 31 and the point 32 where the tapered portion 34 begins. This etching step reduces the plug part 28 by 0.0002 to 0.0004 inch.

After the etching step, the ferrule 7 is subjected to shot peening, as by tumbling or any other method, the same resulting in hardening of the surface of the plug 28 and polishing thereof.

Finally, the two ferrules are subject to anodizing at voltages and at time durations compatible to the aluminum alloys used. This step builds back the losses of surface metal caused by the etching step and reduction in size caused by the peening step and provides a 0.0002 to 0.0004 inch clearance. By swagging the sleeve 10, as by precisely controlled air pressure, a hard, smooth yet delicate fit between the ferrules is achieved.

Even when the alloy used for two ferrules 5 and 7 may differ and regardless of the colors imparted by the anodizing step, the ferrule 5 of the same base size may be interchangeably fitted with a ferrule 7 of a similar base size.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A ferrule unit for connecting two tapered sections of a fishing rod comprising:
   a female ferrule formed as a metallic sleeve having a through bore having a tubular end portion adapted to telescopically connect with the reduced end of one of said rod sections, a flared portion at the opposite end of said bore, and an intermediate tapered portion extending between said two end portions and having a widening taper from the tubular end portion of the bore to the flared end portion,
   the taper of said intermediate tapered portion being substantially less than the taper of the flared end portion of the bore, and
   a male ferrule formed to have a cylindrically tubular end adapted to telescopically connect with the larger end of the other of said rod sections, a plug extending from said tubular end, and
   said plug having a tapered portion on the end thereof in telescopic engagement in the intermediate tapered bore portion of the female ferrule,
   said plug between the latter tapered portion and the cylindrically tubular end being provided with a portion that conforms to the flared end portion of the bore in the female ferrule and telescopically fitting thereinto when the end portion of the plug is telescopically engaged with the correspondingly tapered end of the bore of the female ferrule.

2. A ferrule unit according to claim 1 in which the intermediate tapered portion of the bore in the female ferrule, at its larger end, is in the nature of 0.002 inch larger than at its smaller end and the taper of the tapered end portion of the plug, at its larger end is substantially the same diametral size as said larger end portion, and at its smaller end, is 0.0002 to 0.0004 inch smaller, diametrally than the smaller end of said intermediate tapered portion of the bore in the female ferrule.

3. A ferrule unit according to claim 2 in which an annular shoulder is provided between the cylindrically tubular end of the male ferrule and the adjacent end of the plug.

4. A ferrule unit according to claim 2 in which an outer annular bead is provided on the end of the female ferrule in which the flared portion of the bore in said ferrule is provided.

5. A ferrule unit according to claim 1 in which an O-ring having compressive engagement with the intermediate, tapered portion of the bore in the female ferrule, is provided on the plug of the male ferrule and adjacent the end thereof.